United States Patent [19]

Locke et al.

[11] 4,156,506

[45] May 29, 1979

[54] FUEL INJECTION NOZZLE UNITS

[75] Inventors: Alan W. Locke, Solihull; Dorian F. Mowbray, Burnham, both of England

[73] Assignee: Lucas Industries, Limited, Birmingham, England

[21] Appl. No.: 889,423

[22] Filed: Mar. 23, 1978

[30] Foreign Application Priority Data

Mar. 26, 1977 [GB] United Kingdom ............... 12797/77

[51] Int. Cl.² ........................ B05B 1/30; F02M 51/06; F16K 31/06

[52] U.S. Cl. ................................ 239/585; 123/32 AB; 251/137; 251/139

[58] Field of Search ................ 239/585; 251/129, 137, 251/139, 140; 123/32 AB, 32 EF, 188 B; 335/246

[56] References Cited

U.S. PATENT DOCUMENTS 3,001,757 9/1961 Ball .................................. 239/585 X
3,523,677 8/1970 North ............................... 251/129 X

FOREIGN PATENT DOCUMENTS 1919708 11/1970 Fed. Rep. of Germany ........... 251/137

*Primary Examiner*—Robert B. Reeves
*Assistant Examiner*—Andres Kashnikow

[57] ABSTRACT

A fuel injection nozzle unit includes a plate in which is formed an orifice through which fuel can flow to be mixed with air flowing to the engine. The plate defines a surface for engagement by a disc-like valve member formed from magnetizable material and which is urged into contact with the surface by fuel under pressure which may be assisted by a spring. A core member has a face presented to the aforesaid disc and in which is formed a plurality of grooves extending about the aforesaid outlet. The grooves accommodate electrical windings which are connected in such a manner that the current flow in the windings in adjacent grooves, so that the face of the core presented to the disc forms a series of pole pieces of opposite magnetic polarity. The magnetic field moves the disc away from the aforesaid surface to permit flow of fuel through the outlet.

10 Claims, 6 Drawing Figures

FUEL INJECTION NOZZLE UNITS

This invention relates to a fuel injection nozzle unit of the kind comprising a valve member which can co-operate with the seating to prevent flow of fuel through an outlet and electromagnetic means operable to cause the valve member to move away from the seating thereby to allow fuel flow through the outlet.

The object of the invention is to provide such a nozzle unit in a simple and convenient form.

According to the invention in a nozzle unit of the kind specified said valve member comprises a disc formed from magnetisable material, said seating being defined by a surface onto which opens an outlet, and the electromagnetic means comprises a solenoid core having a face presented towards said disc and disposed substantially parallel to said surface, there being formed in said face a plurality of grooves which are disposed in side by side relationship, the electromagnetic means including electrical windings located in said grooves, said windings being connected so that in use when electric current is passed therethrough the current flow in adjacent portions of said grooves will be in the opposite direction whereby the adjacent portions of said face disposed between said grooves will be polarised to opposite magnetic polarity, said disc being attracted towards said face and away from said surface thereby to permit flow of fuel through said outlet.

Examples of fuel injection nozzle units will now be described with reference to the accompanying drawings in which.

Figure 1:
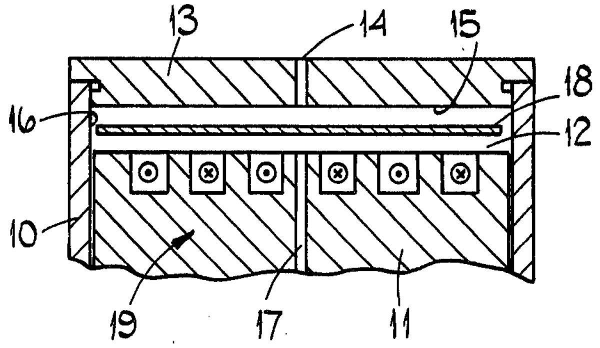
FIG. 1 shows a sectional side elevation through one example of the nozzle unit.
Figure 2:
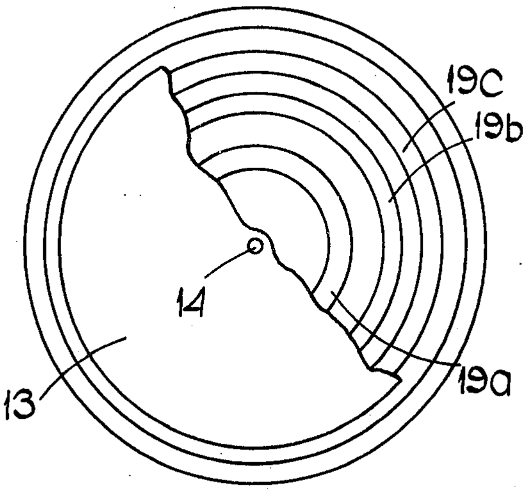
FIG. 2 is an end view of the nozzle unit shown in FIG. 1 with a part removed from the sake of clarity.

Referring to FIGS. 1 and 2 of the drawings the nozzle unit comprises an outer annular body portion 10 in which is located a cylindrical core member 11 formed from magnetisable material and having a front face 12 substantially flat and normal to the longitudinal axis. The body member extends beyond the aforesaid face and is closed by an end closure 13 in which is formed an outlet 14. The end closure defines a sealing surface 15 presented to but spaced from the face 12 of the core member so as to define a chamber 16 to which fuel can flow by means of a passage 17 formed in the core member. Located in the aforesaid chamber is a valve member in the form of a disc 18 formed from magnetisable material. The disc 18 is normally held in contact with the sealing surface 15 by means of the pressure of fuel applied through the passage 17.

The disc is movable away from the sealing surface 15 by magnetic force and when so moved fuel can flow through the outlet 14. The nozzle is intended to direct fuel into the air flowing into the combustion chamber of an engine and the pressure of fuel is therefore much lower than for instance the pressure of fuel required in a fuel injection system where the fuel is directed into the combustion space or spaces of the engine during or at the end of the compression stroke of the engine.

Formed in the face 12 are a plurality of grooves 19. In the particular example three annular grooves 19*a*, 19*b*, 19*c* are provided, the grooves being of annular form and of differing diameters. In each groove is located a single turn winding although there may be a plurality of turns if required. The ends not shown of the individual windings are interconnected so that the direction of current flow in the winding 19*b* is opposite to the directions of current flow in the windings 19*a* and 19*c*. In the section shown in FIG. 1 the direction of current flow in the individual windings at the section, is indicated by the dot and cross configuration. When electric current is passed through the windings the face 12 will be divided up into annular portions of opposite magnetic polarity. In the particular example there will be four such portions namely the annular portion lying outside the groove 19*c*, the portion lying between the grooves 19*b* and 19*c*, the portion lying between the grooves 19*a* and 19*b* and the portion lying within the groove 19*a*. The resulting magnetic field will attract the disc 18 away from the surface 15 to reduce the reluctance of the magnetic circuits. In so doing the force exerted by the fuel pressure on the plate 18 is overcome and fuel can then flow from the chamber 16 through the outlet 14.

The extent of movement of the disc 18 towards the face 12 may be limited so as to ensure that the inlet 17 to the chamber does not become blocked by the disc and also to facilitate the return motion of the disc 18 when the flow of electric current is halted.

Figure 3:
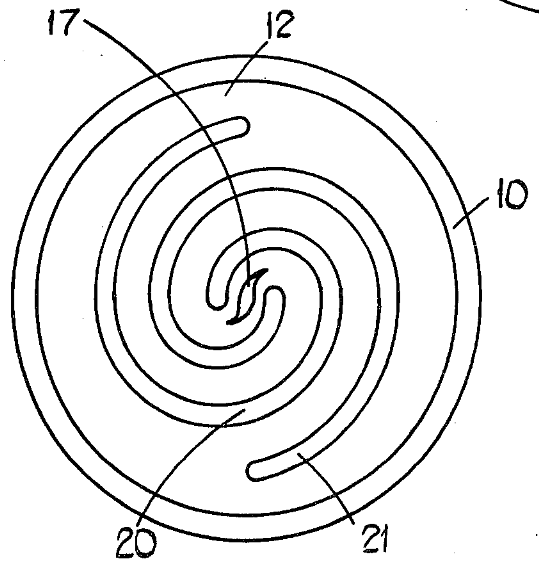
FIG. 3 is a view similar to FIG. 2 showing a modification.

In the arrangement which is shown in FIG. 3 two grooves 20, 21 are provided. These however are of spiral form, one within the other. Each groove locates a winding and the direction of current flow in the two grooves is in the opposite direction so that again the surface 12 will have portions of opposite magnetic polarity thereby to attract the disc 18 towards the surface 12.

Figure 4:
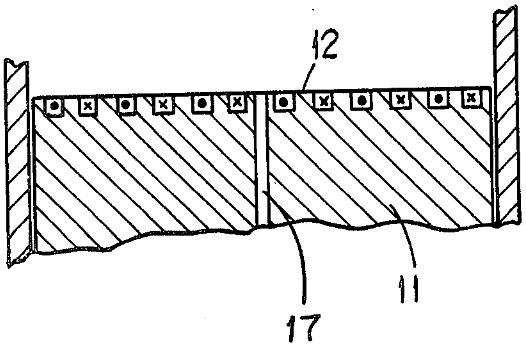
FIG. 4 is a cross sectional view of part of a further modified nozzle.
Figure 5:
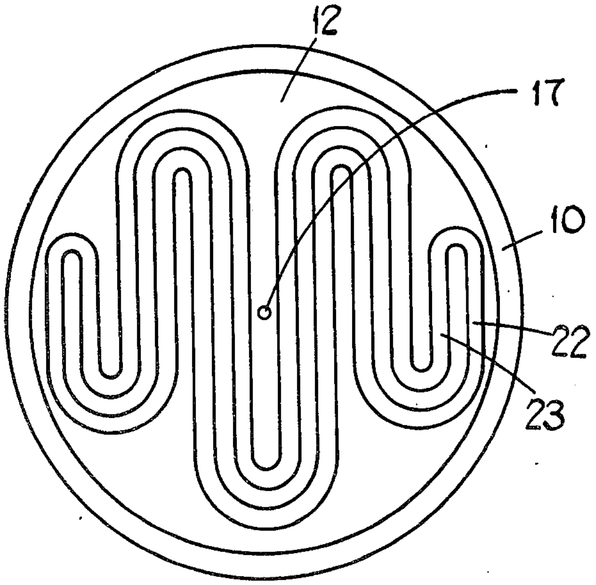
FIG. 5 is an end view of the portion of the nozzle seen in FIG. 4

Turning now to the nozzle unit shown in FIGS. 4 and 5. The basic construction of this nozzle unit is the same as the nozzle unit shown in FIG. 1. What is different however is the arrangement of the grooves. In practice a continuous groove is provided but this can be regarded as two grooves interconnected at their ends. The two grooves are indicated at 22 and 23 and it will be seen that they are formed in the surface 12 in such a manner that they can be regarded as extending laterally in one direction and having curved portions interconnecting the laterally extending portions. A single winding is located in the two grooves and as with the previous examples this may be a single turn winding or it may have a plurality of turns. FIG. 4 shows a section taken at right-angles to the straight portions of the grooves and it will be seen that the current flow in adjacent portions of the grooves is in opposite directions. As a result the portions of the face 12 lying between the grooves will be polarised in opposite manner and a complex magnetic field pattern will be established which will attract the disc 18 towards the surface 12 when electric current is supplied through the winding.

The nozzle units described employ a comparatively light disc forming the valve member and the magnetic field produced when the windings are energised can rapidly move the valve member to the open position. Fuel pressure is utilised to return the valve member to the closed position but this can be supplemented by a light spring which maintains the valve in the closed position when the fuel system is inoperative. It will be understood that the end closure 13 is preferably formed from non-magnetisable material so as not to provide an alternative magnetic path for the flux generated by the winding.

Figure 6:
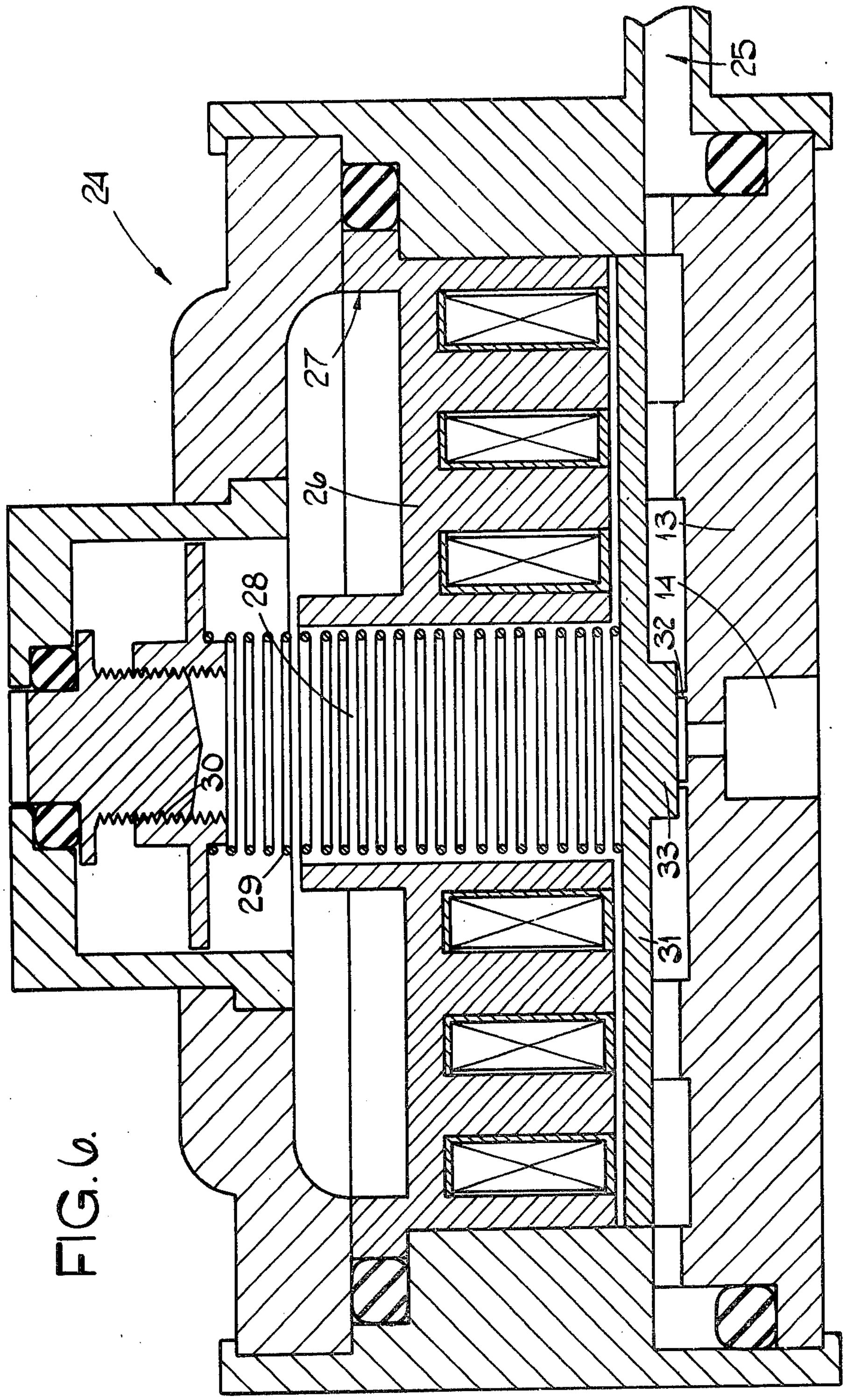
FIG. 6 is a sectional side of a practical nozzle of the type shown in FIG. 1.

Turning now to FIG. 6, a hollow plastics body 24 is provided which as shown, is formed in three interfitting parts. The end closure 13 is secured at the open end of the body and defines the outlet 14. A fuel inlet 25 is provided in the main body portion and secured within the body portion is the core member 26 which is retained in position by an annular flange 27. The core member 26 defines a central aperture 28 in which is located a light coiled spring 29 one end of which engages an adjustable abutment 30 and the other end of which bears against the disc 31 forming the valve member.

The surface of the end closure presented to the disc 31 defines an annular rib 32 which in conjection with a projection 33 on the disc forms the valve. The winding arrangement is as described with reference to FIGS. 1 and 2. A non-magnetic skin is provided on the face of the core member 26 presented to the disc and this assists the movement of the disc towards the closed position by the spring force and the force due to the fuel pressure, by minimising magnetic stiction.

As will be seen resilient seal members are provided at various situations to prevent leakage of fuel from the nozzle unit. In a typical application the pressure of fuel supplied to the nozzle lies in the range 5–30 p.s.i. Moreover, by altering the position of the abutment 30, the force exerted by the spring 29 can be varied.

The nozzle unit described are fast in operation for a number of reasons the main two being the fact that the valve member is very light and the fact that the magnetic circuit is very efficient. A high current can be supplied to the winding to achieve rapid movement of the valve member since the winding or windings will be cooled by the fuel flowing through the nozzle. In addition it will be noted that the nozzle unit is substantially free of co-operating surfaces which need to be accurately machined and which in the case of relatively slidable surfaces absorb the force applied to the valve member and thereby slow the movement of the valve member.

We claim:

1. A fuel injection nozzle unit comprising a valve member which can co-operate with a seating to prevent flow of fuel through an outlet and electromagnetic means operable to cause the valve member to move away from the seating to allow fuel flow through the outlet in which said valve member comprises a disc formed from magnetisable material, said seating being defined by a surface onto which opens an outlet, and the electromagnetic means comprises a solenoid core having a face presented towards said disc and disposed substantially parallel to said surface, there being formed in said face a plurality of grooves which are disposed in side by side relationship, the electromagnetic means including electrical windings located in said grooves, said windings being connected so that in use when electric current is passed therethrough the current flow in adjacent portions of said grooves will be in the opposite direction whereby the adjacent portions of said face disposed between said grooves will be polarised to opposite magnetic polarity, said disc being attracted towards said face and away from said surface thereby to permit flow of fuel through said outlet.

2. A nozzle unit according to claim 1 in which said surface is defined on an end closure located at the end of a hollow body part, said core being secured in said body part and spaced from said end closure to define a chamber, and a fuel inlet to said chamber.

3. A nozzle unit according to claim 2 including resilient means acting on said valve member to assist the action of fuel under pressure to urge the valve member into contact with said seating.

4. A nozzle unit according to claim 1 in which said grooves are of annular form.

5. A nozzle unit according to claim 1 in which two grooves are provided, said grooves being of spiral form one within the other.

6. A nozzle unit according to claim 1 in which two grooves are provided each consisting of straight portions interconnected by curved end portions, the straight portions of the two grooves being alternatively arranged.

7. A nozzle unit according to claim 3 in which said grooves are of annular form and said resilient means comprises a coiled compression spring located within a bore formed in said core member, and an adjustable abutment located in said body part, said spring engaging said abutment so that the force exerted by said spring can be adjusted.

8. A nozzle unit according to claim 7 in which said seating surface is defined on an annular rib about said outlet, said disc being provided with projection for co-operating with the surface defined by said annular rib.

9. A nozzle unit according to claim 8 in which said body part is formed from plastics material.

10. A nozzle unit according to claim 1 in which the face of said core presented to the valve member is provided with a skin of non-magnetic material.

* * * * *